United States Patent
Ballot et al.

(10) Patent No.: US 8,762,594 B2
(45) Date of Patent: Jun. 24, 2014

(54) DETECTION OF USB ATTACHMENT

(75) Inventors: Nathalie Ballot, Sassenage (FR);
Nicolas Florenchie, Grenoble (FR);
Bruno Delplanque, Chaville (FR)

(73) Assignee: ST-Ericsson SA, Plan-les-Ouates (CH)

( * ) Notice: Subject to any disclaimer, the term of this patent is extended or adjusted under 35 U.S.C. 154(b) by 192 days.

(21) Appl. No.: 13/382,418

(22) PCT Filed: Jul. 9, 2010

(86) PCT No.: PCT/EP2010/059931
§ 371 (c)(1),
(2), (4) Date: Jan. 5, 2012

(87) PCT Pub. No.: WO2011/004020
PCT Pub. Date: Jan. 13, 2011

(65) Prior Publication Data
US 2012/0117280 A1    May 10, 2012

(30) Foreign Application Priority Data

Jul. 10, 2009 (FR) ..................................... 09 54857

(51) Int. Cl.
*G06F 3/00* (2006.01)
*H05K 7/10* (2006.01)

(52) U.S. Cl.
USPC ............................... 710/17; 710/18; 710/302

(58) Field of Classification Search
USPC ............................................. 710/17, 19, 302
See application file for complete search history.

(56) References Cited

U.S. PATENT DOCUMENTS

| | | | |
|---|---|---|---|
| 5,628,001 A | 5/1997 | Cepuran | |
| 6,014,132 A * | 1/2000 | Shimada et al. | ............... 345/173 |
| 6,897,648 B2 * | 5/2005 | Lohberg et al. | ............... 324/244 |
| 7,057,754 B1 | 6/2006 | Tsuchiya et al. | |

FOREIGN PATENT DOCUMENTS

| | | | |
|---|---|---|---|
| GB | 2 386 794 A | 9/2003 | |
| WO | WO 2008120044 A1 * | 10/2008 | ................ G06F 1/26 |

OTHER PUBLICATIONS

On-The-Go and Embedded Host Supplement to the USB Revision 2.0 Specification, May 8, 2009.*
Universal Serial Bus Specification, Revision 2.0, Apr. 27, 2000.*
International Search Report issued in corresponding International Application No. PCT/EP2010/059931, mailed Mar. 9, 2011.
Written Opinion of the International Searching Authority issued in corresponding International Application No. PCT/EP2010/059931, mailed Mar. 9, 2011.

* cited by examiner

*Primary Examiner* — Farley Abad
(74) *Attorney, Agent, or Firm* — Patent Portfolio Builders PLLC

(57) ABSTRACT

A change is managed in the attachment state between a first device and a second device which are connected via an interface. The first device comprises a high frequency clock. The first device is in a sleep state in which the high frequency clock is deactivated. A detection of a change in the attachment state of the second device is periodically triggered on said interface, on the basis of a low frequency clock. Upon detection of a change in the attachment state, the sleep mode is exited by activating the high frequency clock.

11 Claims, 3 Drawing Sheets

DETECTION OF USB ATTACHMENT

The present invention relates to USB (Universal Serial Bus) attachment detection. More particularly, it concerns a device having an USB port for data communication with another device, and more particularly the management of the electrical consumption of such a device.

The term "USB" designates a data communication protocol in serial form, defined by the specifications of the USB standard (version 2.0 of the USB Specification).

FIG. 1 illustrates a system 11 of the classic USB type in which a first USB device 10 and a second USB device 14 are connected by an USB interface 15. This interface is generally composed of a cable with four wires equipped at each end with a plug able to cooperate with an USB connector with four or five contacts arranged on the first USB device 10 and on the second USB device 14. The USB interface 15 therefore comprises four or five physical lines: a ground GND, a power supply line VBus, two data lines D+ and D−, and an optional identification line ID. When the second USB device USB 14 is thus physically connected by an USB cable to the first USB device 10, it is said to be attached. Otherwise, the second USB device 14 is said to be detached.

As an example only, the first USB device 10 can correspond to a mobile phone when the second device 14 can be a headset or a computer.

The first USB device 10 comprises a control unit 12 which is an unit that is generally primarily software, and an interface unit 13 which is for the most part generally implemented in the form of hardware. This control unit and this interface unit are connected to each other via an interface 16. This first device is powered via a plug 'PWR'. It also has a high frequency clock 105 and a low frequency clock 104 which are provided for a multiplexer 102.

The first USB device 10 controls certain timings by means of a high frequency clock which is used for the exchanges between the first device 10 and the second device 14. This high frequency clock can be on the order of 38 MHz.

The USB standard is supplemented by an OTG supplemental specification, described in the document "On-The-Go and Embedded Host Supplement to the USB Revision 2.0 Specification—Revision 2.0—May 8, 2009" which additionally contains in its paragraph 5.4 a definition of a protocol whose acronym is ADP for "Attach Detection Protocol", allowing the detection of the attachment of the second USB device 14 to the first USB device 10, and reciprocally. To do this, the ADP protocol allows for the detection of this event by observing changes in capacitance in the power supply line VBus of the interface 15. More specifically, this event is detected by periodically looking for, after having discharged the VBus line, any variation in the time necessary for the VBus line to return to a predetermined voltage level. This periodic attachment detection is known as "ADP probing" in the vocabulary of the USB standard. The operations conducted by the first USB device 10 consisting of detecting the ADP probing attempts by the second USB device 14 are called "ADP sensing". They also allow the first USB device 10 to know whether the second USB device 14 is attached or not.

The OTG supplemental specification specifies that the ADP probing must be executed at a frequency of every 1.9 to 2.6 seconds, typically every 2 seconds. The ADP probing as well as the ADP sensing are done at periodic requests of the control unit 12 using the high frequency clock. It therefore results that the first device 10 cannot enter into a state where the high frequency clock is deactivated as long as it is performing these operations.

However, it is highly advantageous to be able to switch the first device into a state in which the high frequency clock is off. In fact, once the high frequency clock is deactivated, the power consumption of the first device can be noticeably reduced.

A need to improve the situation therefore exists.

A first aspect of the invention proposes a method for managing a change of the attachment state between a first device and a second device connected to each other via an interface. The first device comprises a high frequency clock. The first device is in a sleep state in which the high frequency clock is deactivated. The method comprises the following steps at the first device:

/1/ periodically triggering, on the basis of a low frequency clock, a detection of a change in the attachment state of the second device on said interface;

/2/ upon detection of a change in the attachment state, waking from the sleep state by activating the high frequency clock.

When the first device is in a sleep state, it should be awakened if a change in the attachment state of the second device is detected, so that the first device can take the change into account and handle it properly.

To allow the first device to handle this event, although it is in a sleep state in which the high frequency clock is deactivated, it is advantageously provided that a low frequency clock allows periodically testing for this event, with the sleep state ending only if such an event has actually occurred.

With these measures, it is thus possible to detect this event in the first device, with no use of a high frequency clock when no change in the attachment state is detected.

As a result, the first device can advantageously remain in the sleep state as long as the second device(s) do not change their attachment state. By proceeding in this manner, the amount of energy consumed can be considerably reduced. When the first device is a mobile device, such as a portable computer or a mobile phone or a video camera or any other portable terminal which presents at least one USB port, the implementation of such a management method according to an embodiment of the invention is highly advantageous with regards to the gain in autonomy that it can represent.

To respond to other requirements, during the step /1/, the event relative to a change in the attachment state of the second device can be identified by detecting a capacitance change in the interface, in particular, by implementing the ADP protocol defined by a supplemental specification "On-The-Go and Embedded Host Supplement to the USB Revision 2.0 Specification—Revision 2.0—May 8, 2009".

In one embodiment, the first device comprises a control functionality and an interface functionality with the second device, with said functionalities being connected to each other via an interface. The step /1/ is then realized by the interface functionality. In this case, the interface functionality notifies the control functionality of the change in attachment state of the second device, via an interrupt line. The interface is for example an ULPI interface comprising the interrupt line.

A second aspect of the invention proposes an interface unit comprising means adapted to implement a method for managing changes in the USB attachment state according to the first aspect of the invention.

Such an interface unit can correspond to an USB Transceiver within a first USB device. This interface unit can be connected to an USB control unit, or USB Controller, via an UTMI interface (USB2.0 Transceiver Macrocell Interface) or via an ULPI interface (UTMI Low Pin Interface).

No limitation is placed on the invention with regards to the architecture of the first device. Thus the interface unit and the control unit can for example be implemented on the same chip and connected by an UTMI interface. They can also be implemented on two separate chips, and these chips can for example be connected via an ULPI interface.

A third aspect of the invention proposes a device comprising means adapted to implement a method for managing changes in the USB attachment state according to the first aspect of the invention, in particular an interface unit according to the second aspect.

A fourth aspect of the invention proposes a system comprising a first device according to the third aspect of the invention and at least one second device.

Other aspects, features, and advantages of the invention will become apparent upon reading the description of one of its embodiments.

The invention will also be better understood with the aid of the drawings, in which:

FIG. 1 illustrates a classic USB system, already described;

FIG. 2-A illustrates the main steps in a method for managing a change in the attachment state of a second device to the first device, implemented according to an embodiment of the invention;

FIG. 2-B illustrates an USB system according to an embodiment of the invention;

In the following sections, a first device 10 and a second device 14 are considered. As a non-limiting example, the first device can be a mobile phone and the second device 14 an USB voice headset or a computer.

In the present description, for illustrative purposes only, the architecture of the first device is based on two chips for the control unit and the interface unit respectively, connected to each other via an ULPI interface and possibly an interrupt line. Interrupt line is understood to mean an active electrical line whose change in level indicates a state change in the system. It is easy to apply it to any other possible device architecture, including architecture using an UTMI interface for example.

Figure 2B:
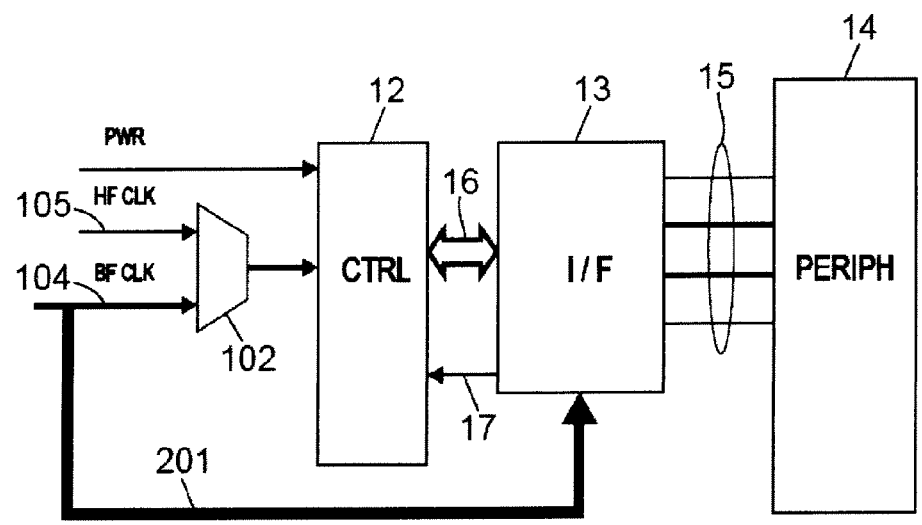
Figure 2A:
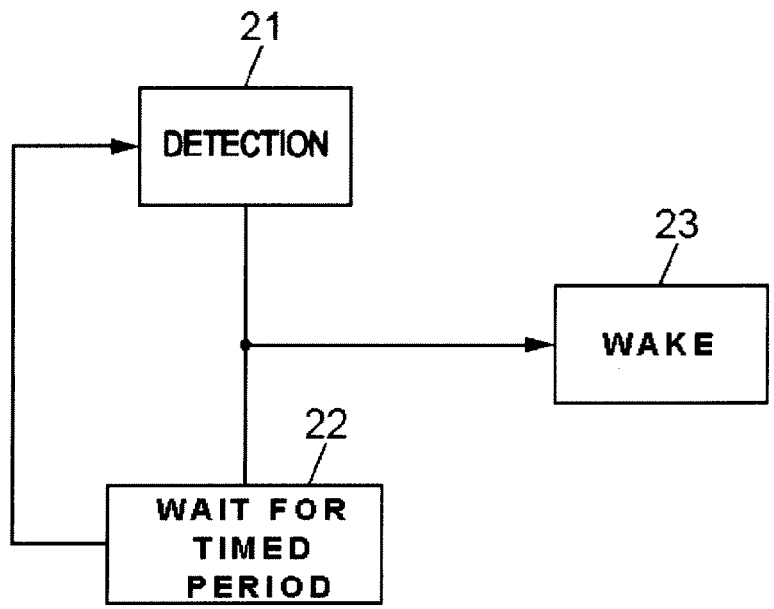

FIG. 2-A illustrates the main steps of a method for managing a change in the attachment state of a second device to the first device, implemented according to an embodiment of the invention.

The first device is in a sleep state in which the high frequency clock is deactivated. At the first device, in a step 21, the detection is triggered of any change in the attachment state of the second device on the interface. This event corresponds for example to the plugging in of the second device to the first device using a cable, if the second device was not yet so connected, or conversely the removal of said cable if the second device was so connected until that moment.

If no state change was detected during the step 21, the method waits for a period during a step 22, with the aid of a low frequency clock. At the end of this period, the method can again be executed starting from the step 21.

However, if at the end of the step 21 a state change has been detected at the interface unit, the first device is awakened from its sleep state in a step 23, in particular by activating the high frequency clock.

For example, a notification, in the form of triggering a hardware interrupt, can be sent to the control unit from the first device during the step 23.

In a first configuration, the step 21 can be realized by performing ADP probing at the interface unit. A capacitance change is looked for in the VBus power supply line of the interface 15, in accordance with the supplemental specification "On-The-Go and Embedded Host Supplement to the USB Revision 2.0 Specification—Revision 2.0—May 8, 2009."

In a second configuration, the step 21 can be realized by performing ADP sensing at the interface unit. Changes are looked for in the ADP probing activity performed by a possible second USB device on the interface 15, in accordance with the supplemental specification "On-The-Go and Embedded Host Supplement to the USB Revision 2.0 Specification—Revision 2.0—May 8, 2009." Thus if ADP probing activity is no longer occurring when such was previously the case, this translates as a variation in the attachment state of the second device at the interface. Conversely, if ADP probing activity is occurring when such was not previously the case, this also translates as a variation in the attachment state of the second device at the interface.

Figure 1:
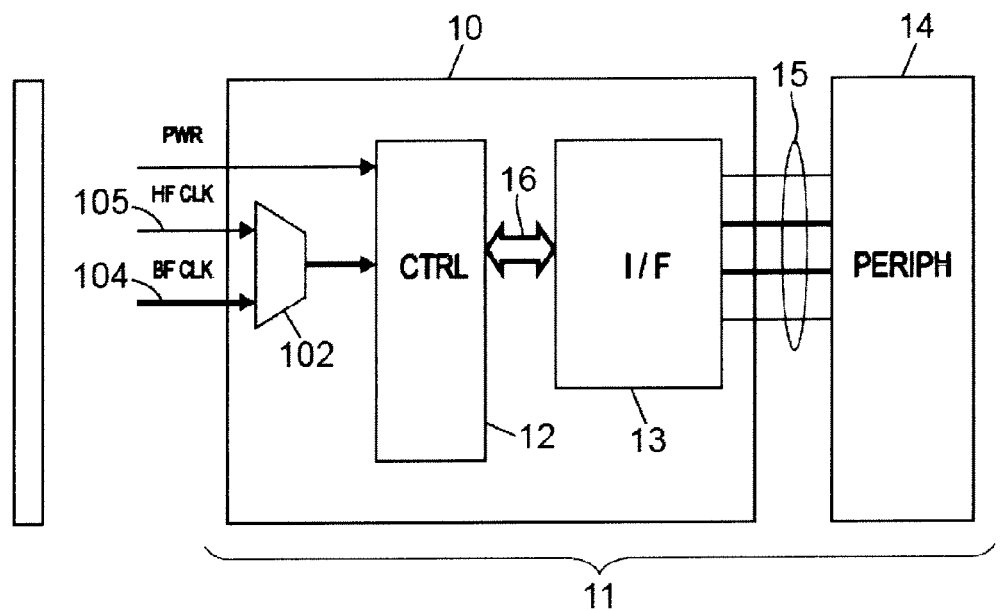

FIG. 2-B illustrates an USB system according to an embodiment of the invention. The same references as those used in FIG. 1 relate to the same elements. Note that, for illustrative purposes only, the architecture of the first device is composed of two chips 12 and 13 connected to each other by an interface 16 on the basis of the high frequency clock which can be ULPI.

However, the invention applies just as easily to any other architecture of the first device. No limitation is placed on this aspect. One can in particular apply the invention to a single chip architecture in which the control unit and the interface unit are directly and simply connected to each other.

It should be noted that the low frequency clock is advantageously provided here via a link 201 to the interface unit 13. Thus this low frequency clock can be used to count periods of time when the high frequency clock is off, thus meeting the requirements of the standard while saving energy.

The interface 16 comprises an interrupt line on which the interface unit 13 can generate an interrupt in the form of an electrical signal to the control unit 12. When the interface 16 is of the ULPI type, this interrupt line can be the D3 ULPI interrupt line. Alternatively, a dedicated interrupt line 17 between the interface unit 13 and the control unit 12 can be used. No matter what the embodiment, after a change in the attachment state of the second device, the interrupt line is used to trigger an interrupt causing the USB system to wake from its sleep state, and more particularly the control unit 12 with an activation of the high frequency clock.

Figure 3:
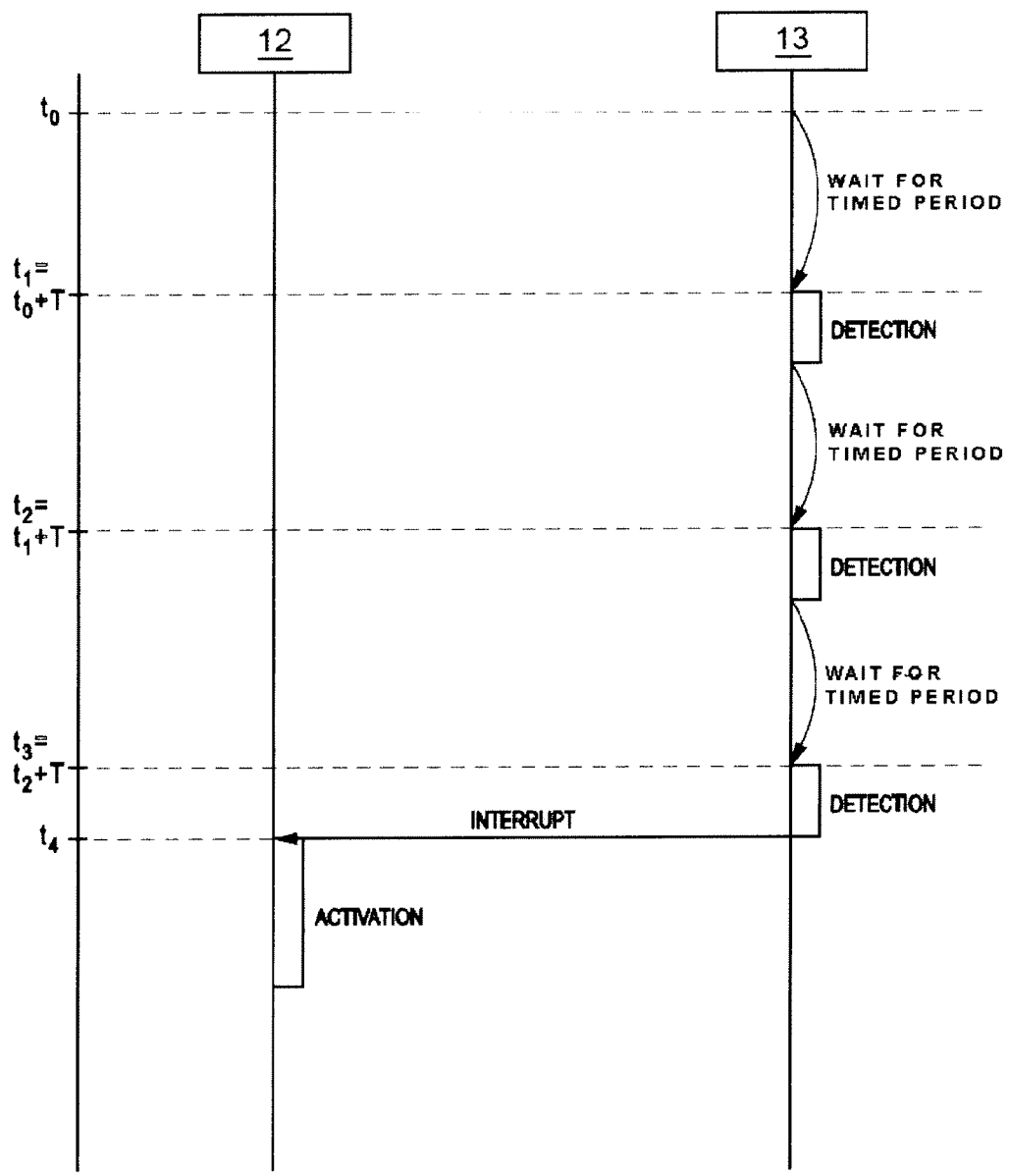
FIG. 3 illustrates a sequence diagram of an implementation of a method for detecting the attachment of a second device to the first device implemented according to an embodiment of the invention.

FIG. 3 illustrates a sequence diagram of an implementation of a method for detecting the attachment of a second device to the first device implemented according to an embodiment of the invention.

Initially, at time $t_0$, the control unit 12 is in a sleep state in which the high frequency clock is deactivated, thus advantageously allowing the reduction of the energy consumption of this first device. The low frequency clock of the first device can remain continuously available, because the energy it uses is negligible compared to the energy consumed by the high frequency clock.

The interface unit 13 waits for a period of time T, on the basis of the low frequency clock. According to the OTG supplemental specification, the time T is between 1.9 and 2.6 seconds.

Then at a time $t_1$ occurring at T seconds after time $t_0$, the interface unit 13 triggers a detection of any change in the attachment state of the second device on the interface. This periodic attachment detection can, depending on the configuration of the first device 10, be ADP probing or alternatively ADP sensing.

As no change in state is detected at time $t_1$, the interface unit 13 triggers a new detection at time $t_2$ after a wait period, then for the same reasons, at time $t_3$ after a wait period.

At time $t_3$, a change in state is detected at the interface unit 13. The interface unit 13 then triggers the sending of an interrupt to the control unit 12.

At time $t_3$, the control unit 12 receives the interrupt, and activates the high frequency clock, causing it to awaken from its sleep state. The control unit 12 can then handle in the conventional manner the change in the attachment state of the second device.

Figure 4:
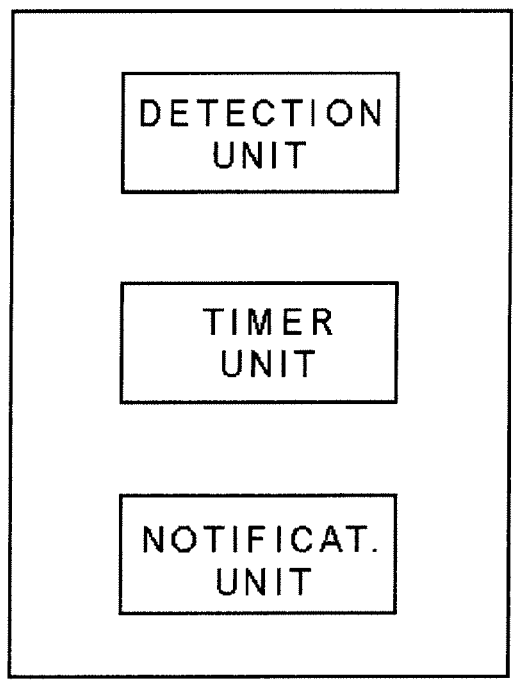
FIG. 4 illustrates an USB system according to an embodiment of the invention.

FIG. 4 illustrates an interface unit 13 in a first device 10 additionally comprising a control unit and means for communicating with a second device via an interface 15 on the basis of a high frequency clock. It comprises:
- a detection unit 51 adapted to detect a change in the attachment state of the second device to the first device at said interface when the first device is in a sleep state;
- a timer unit 52 adapted to trigger periodically, on the basis of a low frequency clock, the detection of a change in state; and
- a notification unit 53 adapted to notify, in an electrical manner, the control unit of a change in the attachment state of the second device.

In particular, the high frequency clock of the interface unit 13 is activated upon detection by the detection unit of a change in the attachment state of the second device to the first device.

In this manner, a first device can comprise such an interface unit.

The invention claimed is:

1. A method for managing a change in the attachment state between a first device and a second device which are connected via an interface, said first device comprising a control unit and a high frequency clock and being adapted to communicate with said second device via said interface,
said first device being in a sleep state in which the high frequency clock is deactivated, wherein said method comprises the following steps at the first device:
(a) periodically triggering, on the basis of a low frequency clock, a detection of a change in the attachment state of the second device to the first device at said interface, a change in the attachment state of the second device corresponding to a capacitance change at the interface; and
(b) upon detection of a change in the attachment state, notifying, in an electrical manner, the control unit of said change and waking the first device from the sleep state by activating the high frequency clock.

2. A management method according to claim 1, wherein, during the step (a), a change in the attachment state of the second device is detected by implementing an attach detection protocol (ADP).

3. A management method according to claim 1, wherein the first device comprises a control function and an interface function with the second device, said function being connected to each other via an interface, the step (a) being realized by the interface functionality.

4. A management method according to claim 3, wherein, in step (a), the interface function notifies, via an interrupt line, the control function of the change in the attachment state of the second device.

5. A management method according to claim 4, wherein the interface is an ULPI interface comprising the interrupt line.

6. A management method according to claim 1, wherein
said low frequency clock is separate from said high frequency clock.

7. An interface unit in a first device, said first device additionally comprising a control unit and a high frequency clock and being adapted to communicate with a second device via an interface;
with said interface unit comprising:
a detection unit adapted to detect a change in the attachment state of the second device to the first device at said interface when the first device is in a sleep state in which the high frequency clock is deactivated, a change in the attachment state of the second device corresponding to a capacitance change at the interface;
a timer unit adapted to trigger periodically, on the basis of a low frequency clock, a detection by the detection unit of a change in the attachment state of the second device to the first device at said interface; and
a notification unit adapted upon detection of a change in the attachment state to notify, in an electrical manner, the control unit of a change in the attachment state of the second device and to wake the first device from the sleep state by activating the high frequency clock.

8. An interface unit according to claim 7, wherein high frequency clock is activated upon detection, by the detection unit, of a change in the attachment state of the second device to the first device.

9. A system comprising a device according to claim 8 and at least one second device.

10. A device comprising an interface unit according to claim 7.

11. An interface unit according to claim 7, wherein
said low frequency clock is separate from said high frequency clock.

* * * * *